(12) United States Patent
Hughes

(10) Patent No.: US 6,918,167 B2
(45) Date of Patent: Jul. 19, 2005

(54) METHOD OF ATTACHING AND ALIGNING A CLOSURE PANEL

(75) Inventor: Russell Vernon Hughes, Redford, MI (US)

(73) Assignee: Arc Kinetics LLC, Redford, MI (US)

( * ) Notice: Subject to any disclaimer, the term of this patent is extended or adjusted under 35 U.S.C. 154(b) by 190 days.

(21) Appl. No.: 10/353,265

(22) Filed: Jan. 29, 2003

(65) Prior Publication Data

US 2003/0140477 A1 Jul. 31, 2003

Related U.S. Application Data

(60) Provisional application No. 60/352,668, filed on Jan. 29, 2002.

(51) Int. Cl.$^7$ ................................................ B23P 11/00
(52) U.S. Cl. ........................ 29/407.09; 29/407.1; 29/11; 29/525.02; 29/525.11; 29/525.14; 49/502; 228/139; 228/214; 228/244; 269/905; 296/202
(58) Field of Search ........................... 29/407.09, 407.1, 29/11, 464, 525.01, 524.14, 525.02, 525.11, 559; 228/139, 140, 244, 214, 52, 41, 234.1, 262; 219/202; 269/53, 319, 905, 909; 49/502; 16/221; 296/146.11, 146.1, 202

(56) References Cited

U.S. PATENT DOCUMENTS

| | | | |
|---|---|---|---|
| 4,437,784 A | | 3/1984 | Peterson |
| 4,438,971 A | | 3/1984 | Zaydel et al. |
| 4,760,633 A | | 8/1988 | Dacey, Jr. |
| 4,775,559 A | * | 10/1988 | Kanamori ............... 428/31 |
| 4,998,332 A | | 3/1991 | Dacey, Jr. |
| 6,141,829 A | * | 11/2000 | Boyer ................... 16/224 |
| 2004/0148737 A1 | * | 8/2004 | Dunneback et al. ...... 16/221 |

* cited by examiner

*Primary Examiner*—Jermie E. Cozart
(74) *Attorney, Agent, or Firm*—Carlson, Gaskey & Olds

(57) ABSTRACT

A method of aligning and duplicating alignment includes welding a washer over a larger opening in a hinge once in an aligned position relative to a vehicle door. The door is mounted into an alignment fixture and the hinges are installed over threaded studs extending from the door. The washer is placed onto the threaded stud and tightened against the hinge, covering the larger opening in the hinge. The larger opening in the hinge allows movement of the hinge relative to the door for alignment. The washer defines an opening with a smaller opening sized to provide relatively little clearance for the threaded stud, and thereby maintain alignment between the door and hinge. The washer is permanently attached by a welding operation to allow duplication of door hinge alignment during reassembly.

26 Claims, 5 Drawing Sheets

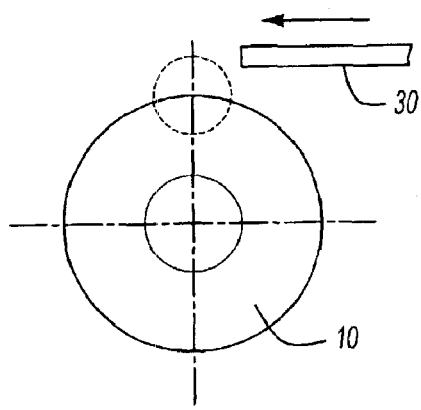
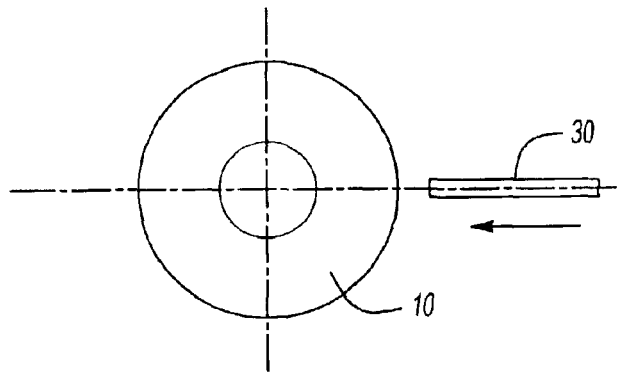
*Fig-7A*  *Fig-7B*
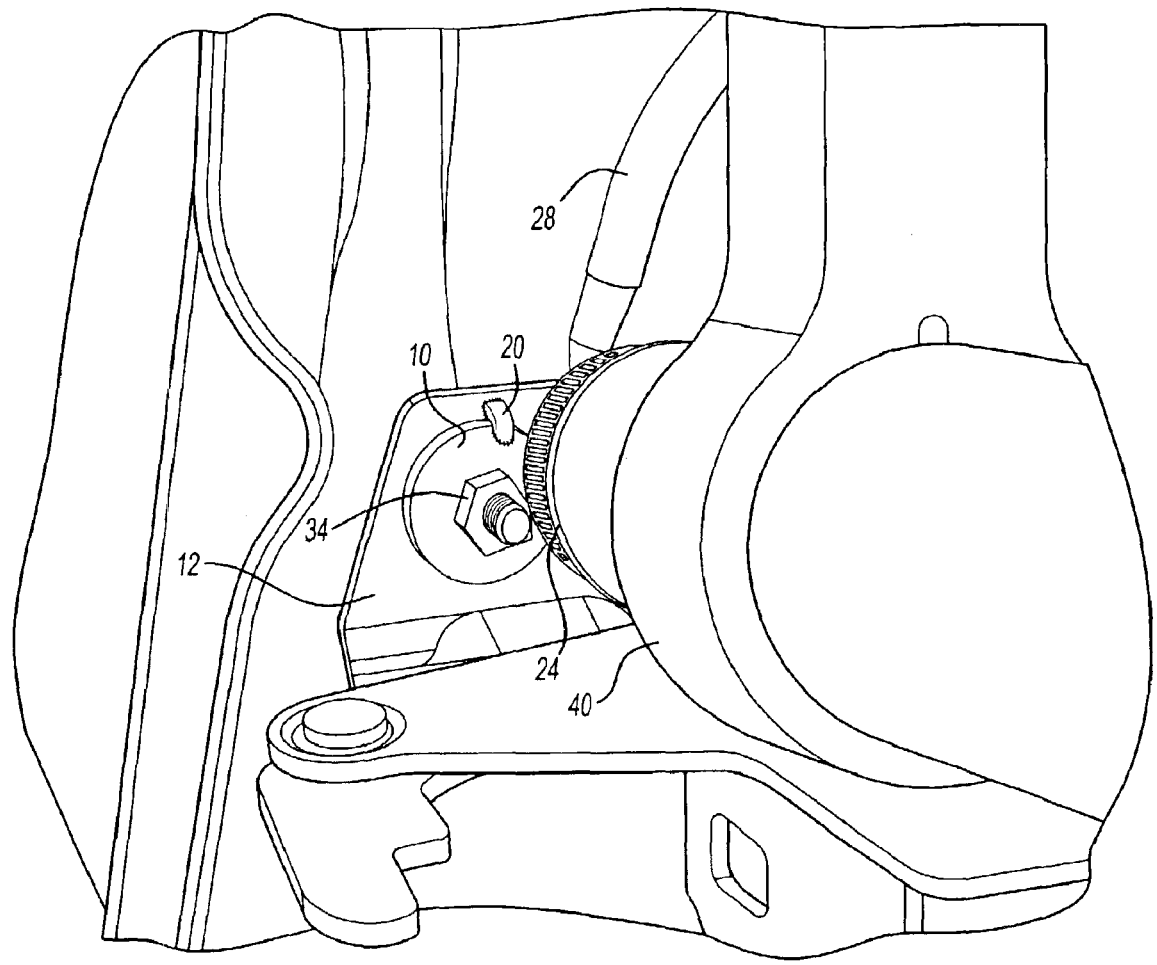
*Fig-8*

METHOD OF ATTACHING AND ALIGNING A CLOSURE PANEL

This application claims priority to U.S. provisional application Ser. No. 60/352,668 filed Jan. 29, 2002.

BACKGROUND OF THE INVENTION

This application relates to a method and system for attaching and aligning aperture closures during assembly, and specifically to a method of attaching a vehicle door such that proper alignment is maintained during reassembly.

Typically, an automotive door, hood, trunk lid or any other closure panel assembly is fitted to each individual automobile before painting to prevent damage and marring caused by unwanted contact of a door panel with a body panel. A hinge is attached and aligned with the door. The door is then aligned with the automobile body and the hinge secured. The door is then separated from the hinge and car body to be painted separate from the car body. After painting and further assembly, the door is reassembled to the hinge and car body.

Conventional methods utilize an adhesive to bond a washer permanently to cover an opening in the door hinge. Tightening a threaded member extending through the opening bolt or stud ensures that the adhesive bonds the washer permanently in place. The door is removed for further assembly and paint operations and than reassembled to the car body. Prior alignment of the door panel before painting prevents damage to the paint from contact between the body and the door panel.

In many instances, the adhesively bonded washer becomes dislodged or disoriented during subsequent operations. Further, in some instances during reinstallation of the door to the vehicle, the threaded stud of the door will bang into the adhesive washer partially or completely dislodging the washer from the hinge. As appreciated, once the washer is dislodged, the door must be realigned, requiring additional assembly time and further risk of damage to the vehicle body and door.

In addition to assembly problems, adhesively backed washers are costly. Typically, the cost of the adhesive backed washers is approximately thirty cents each and must be specially fabricated and ordered. The adhesively backed washers must also be handled differently than standard washers further increasing assembly costs.

Accordingly, it is desirable to develop a robust and cost efficient method of maintaining and duplicating vehicle door and closure panel alignment to prevent damage to coatings and improve assembly efficiencies.

SUMMARY OF THE INVENTION

An embodiment of this invention is a method of attaching a hinge to a door in an aligned position and maintaining alignment of the hinge to the door during reassembly.

The method includes welding a washer over a larger opening in the hinge once in an aligned position. The door is mounted into an alignment fixture and the hinges are installed over threaded studs extending from the door. The washer is placed onto the threaded stud and tightened against the hinge, covering the larger opening in the hinge. The larger opening in the hinge allows movement of the hinge relative to the door for alignment. The washer defines an opening with a smaller opening sized to provide relatively little clearance for the threaded stud, and thereby maintain alignment between the door and hinge.

The washer is permanently attached by welding operations such that the washers are accurately affixed without the need for an adhesive pad. The cost of welding the washer in place with a plasma arc welding or brazing operation is approximately 4 cents. As appreciated, such a cost savings considered in conjunction with current vehicle production volumes is of great interest to automotive manufacturers.

The method of this invention provides a robust and cost effective means of maintaining and duplicating a desired door hinge alignment to prevent damage, and speed reassembly.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 7a is a schematic view of improper feed wire orientation;

FIG. 7b is another schematic view of improper feed wire orientation;

FIG. 8 is a perspective view of a hinge attached to a vehicle door, and a plasma torch;

DETAILED DESCRIPTION OF THE PREFERRED EMBODIMENT

Figure 1:
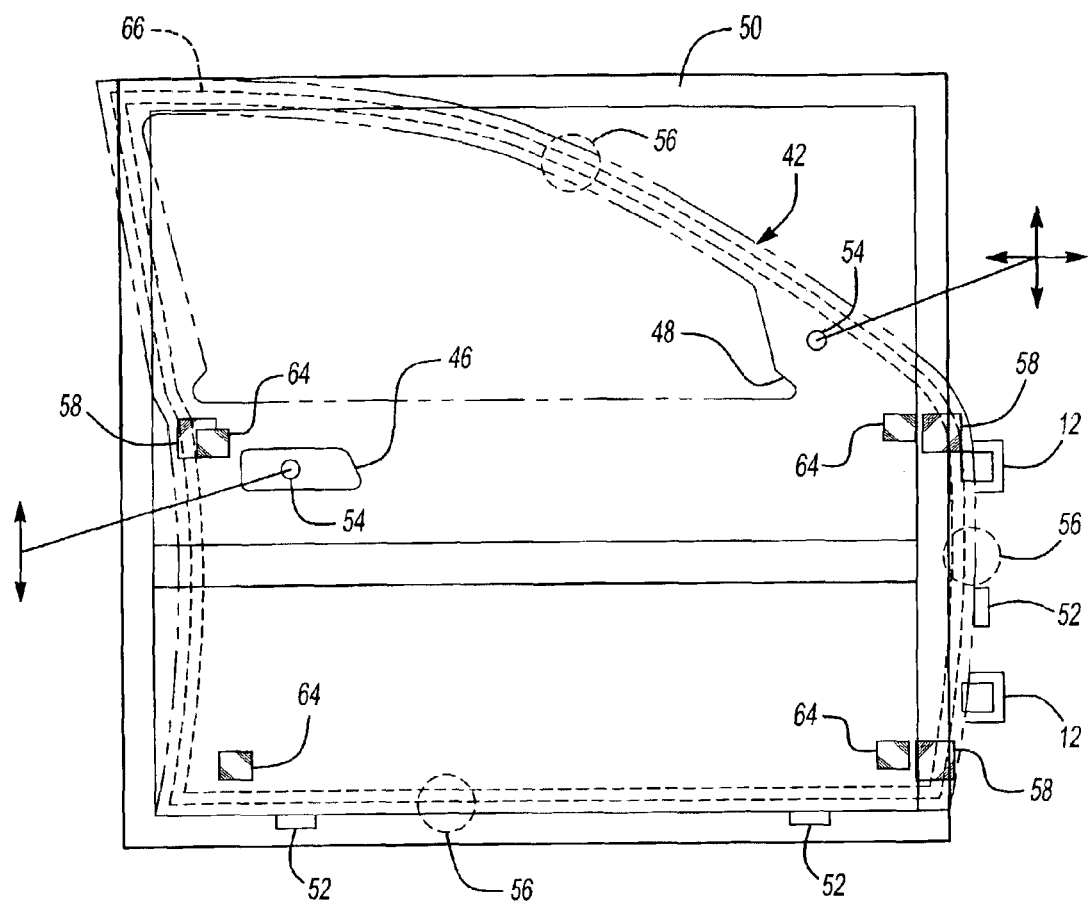
FIG. 1 is a schematic view of a closure panel mounted within an alignment fixture.
Figure 10:
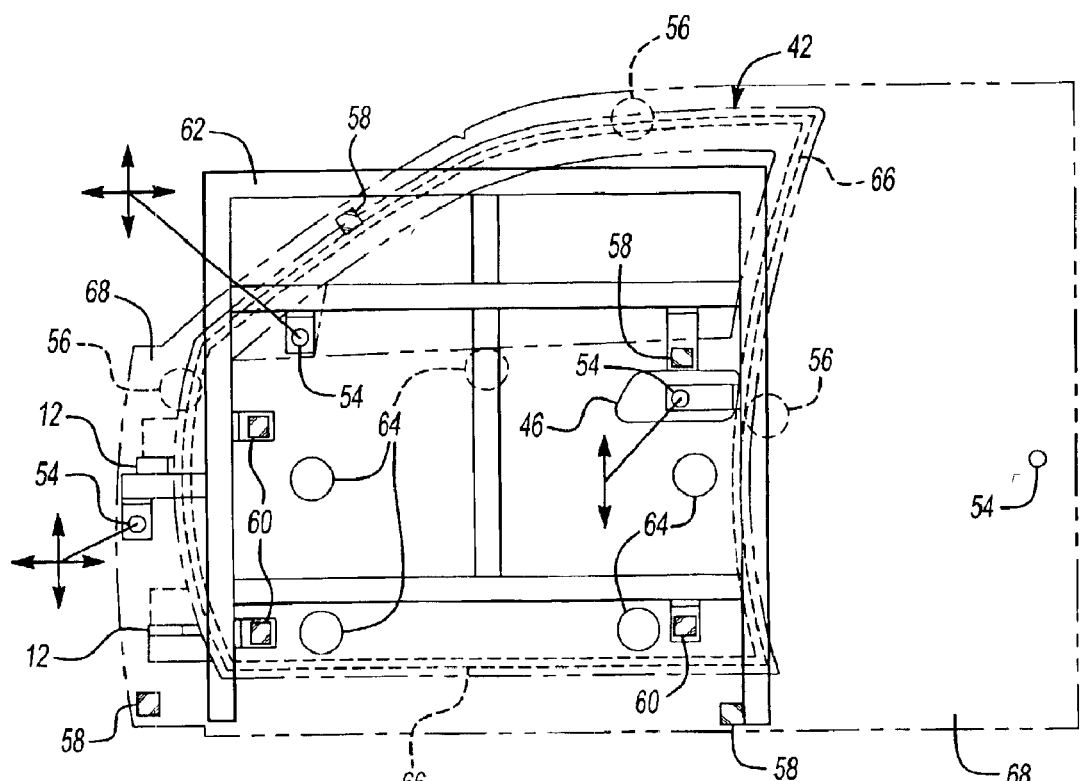
FIG. 10 is a schematic view of a door alignment fixture for aligning the door to the vehicle body.

Referring to FIG. 1, each door 42 includes at least one position-locating pin 54. Each position-locating pin 54 is positioned relative to other position locating pins 54 disposed at specific points throughout the vehicle body 68 (FIG. 10). The relative position and configuration between each position-locating pin 54 defines the geometric relationship between different parts of the vehicle body 68 and closure panels such as the door 42. A worker skilled in the art understands the function and use of the position locating pins, and further understands that the position and number of position locating pins is application dependent.

The method of this invention utilizes a hinge alignment fixture 50 to which the door 42 is mounted and aligned relative to the position locating pins 54. Hinges 12 are located and aligned relative to the position locating pins 54 inserted into the door 42. Preferably, the position locating pins 54 are inserted into the door 42 at an opening for a door handle 46, and an opening for a side view mirror 48. Aligning the hinges 12 relative to the position locating pins 54 provides alignment of the door 42 relative to the body of the vehicle body 68 (FIG. 10).

In addition to aligning each hinge 12 relative to the position locating pins 54, the alignment fixture 50 includes support pads 52 to align the door 42 within the fixture 50. The support pads 52 hold the door 42 in place vertically and horizontally. Floating pads 56 provide additional alignment by locating on a portion of the door 42 for mounting of weather stripping indicated by dashed lines 66 on the inside of the door 42. The floating pads 56 represent the position and configuration of the weather stripping 66 such that the hinge 12 is also aligned relative to the weather stripping 66 once it is installed to the door 42 is subsequent assembly operations. Alignment of the hinge 12 relative to the weather stripping 66 ensures that a uniform pressure will be applied to the weather stripping 66 around the entire door 42 when in a closed position against the vehicle body 68. Uniform pressure along the entire length of the weather stripping 66 provides uniform and consistent sealing against water intrusion along with wind noise abatement. Such advantages of consistent and uniform pressure about the entire length of the weather stripping 66 are known.

Figure 4:
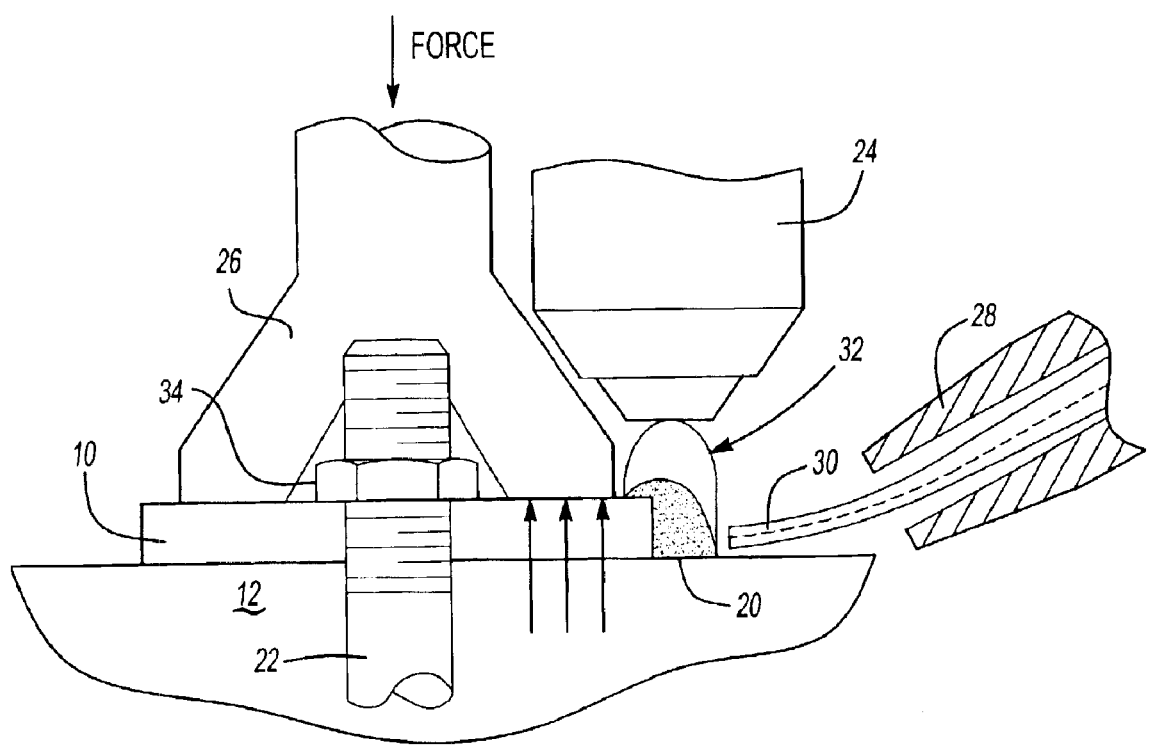
FIG. 4 is schematic view of the washer and hinge during welding.

The hinge 12 is attached to the door 42 once properly aligned relative to the position locating pins 54, the floating pads 56 and the support pads 52. The hinge 12 is attached to the door 42 by nut threaded onto a threaded stud 22 (FIG. 4). Preferably, two threaded studs 22 extend from the door 42 for each hinge 12. Note that preferably, there are two hinges 12 mounted to the door 42.

Figure 2:
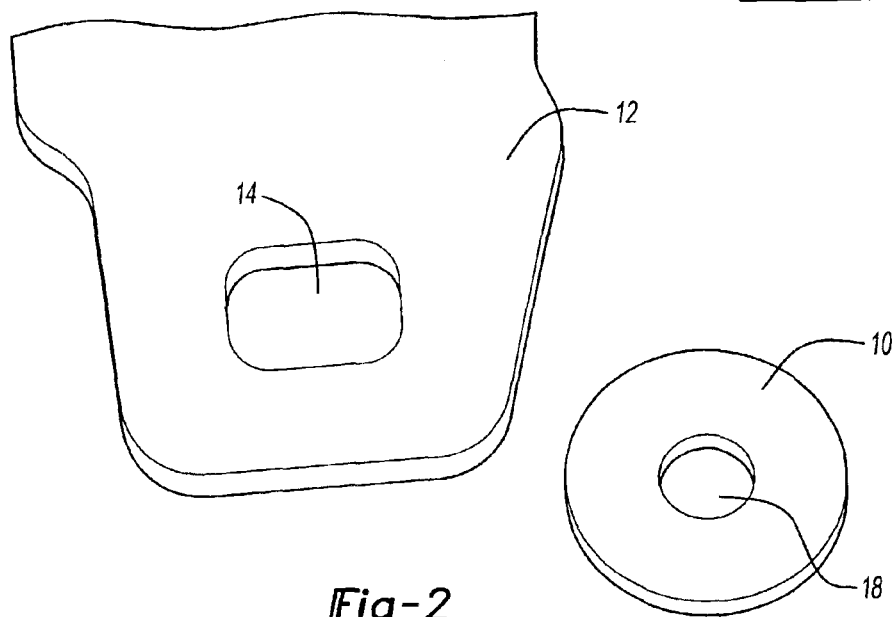
FIG. 2 is a perspective view of a hinge and a washer.

Referring to FIG. 2, the door hinge 12 defines an opening 14. Assembly steps include extending the threaded stud 22 through the opening 14 and the hole 18 of the washer 10. The door 42 is aligned by the locating pins 54, floating pads 56 and the support pads 52. A nut 34 is tightened onto the threaded stud 22 to hold the washer 10 and the hinge 12 in the properly aligned position on the door 42.

Figure 3:
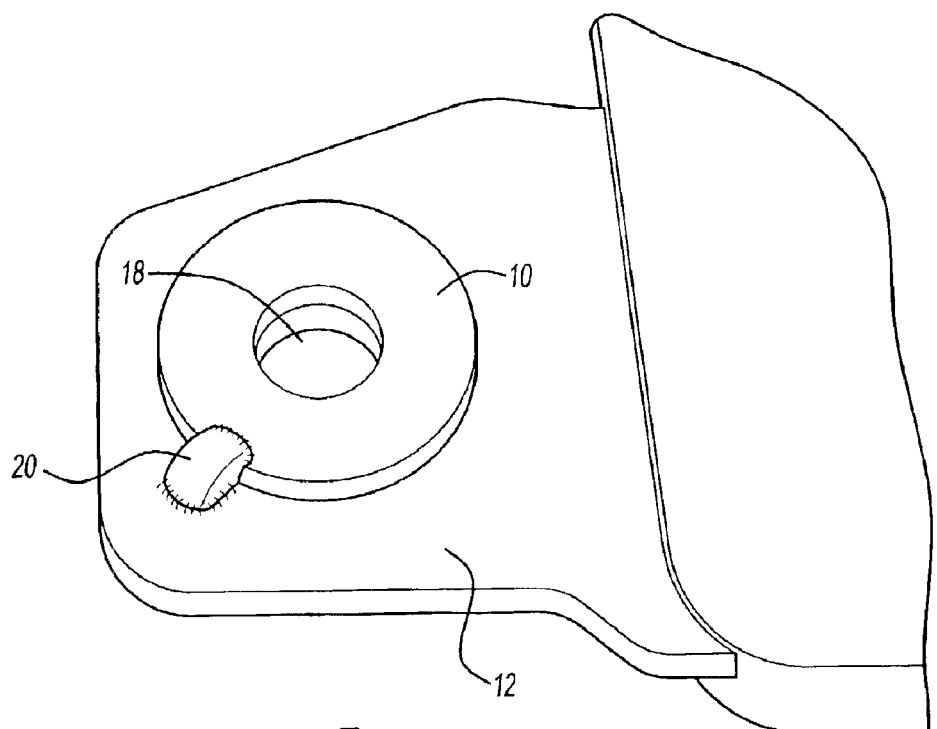
FIG. 3 is a perspective view of the washer welded to the hinge.

Referring to FIG. 3, the washer 10 is then secured to the hinge 12 in the properly aligned position by a weld 20. Each washer 10 for each hinge 12 mounted to the door 42 receives a weld 20 to secure and maintain the properly aligned position of the door 42. The hole 18 of the washer 10 is sized relative to the threaded stud 22 to allow only a desired amount of clearance that is within application specific parameters for proper alignment of the door 42. The washer 10 is preferably a circular disk of a standard known configuration. The specific thickness of the washer 10 corresponds to weld requirements.

The door 42 including the mounted hinges 12 is aligned to the automobile body, and the hinges 12 are secured to the vehicle body 68. The door 42 is then removed from the hinges 12 by unthreading the nut 34. Subsequent assembly steps are then performed on the vehicle body 68 and the door 42 separately. These steps include painting of the door 42 and of the vehicle body 68. Assembly is more efficiently accomplished by removing the door 42 from the vehicle during subsequent assembly operations. Subsequent assembly operations are known and a worker skilled in the art would understand that assembly operations subsequently performed and the efficiencies gained from such a method of assembly. Note that the washer 10 is permanently affixed to the hinges 12 by way of the weld 20 in the previous aligned position. In this way, upon reassembly of the door 42 to the hinges 12, the threaded stud 22 is simply inserted through the hole 18 defined by the washer 10 in order to be properly aligned relative to the vehicle body 68. In other words, when the door 42 is replaced back onto the automobile body the permanently affixed washer 10 ensures that the previous alignment is maintained and duplicated. Duplication of the previous alignment is maintained and aid in the prevention of damage to the door 42 and vehicle body 68 that may be caused by improper alignment or readjustment steps.

The method of this invention affixes the washer 10 to the hinge 12 by the weld 20. The threaded stud 22 extends through the opening 14 defined by the hinge 12. The opening 14 is much larger than the threaded stud 22 to allow movement and adjustment of the hinge 12 relative to the door 42. A washer 10 is placed over the opening 14 and the threaded stud 22 is extended through the opening 14 and the washer 10. The weld 20 is preferably accomplished by way of a plasma arc brazing or plasma arc welding process. However, it is within the contemplation of this invention to use other welding process as would be known to one skilled in the art, such as gas tungsten welding, laser brazing, laser welding, etc. The weld 20 secures the washer 10 in place during disassembly, paint and reassembly of the hinge 12 and thereby the door.

Referring to FIG. 4, the method includes the steps of aligning the door 42 and thereby the hinge 12 on the threaded studs 22. The threaded stud 22 extends through the hinge 12 and the washer 10. The door 42 and hinge 12 are aligned properly by the alignment fixture 50 and the nut 34 threads onto the threaded stud 22 and is tightened to securely align the hinge to the door 42. A plasma arc torch 24 positioned between the washer 10 and the hinge 12 emits a welding arc 32. A wire guide 28 feeds filler wire 30 into the welding arc 32 to form the weld or brazement 20 between the washer 10 and the hinge 12. The washer 10 and the hinge 12 are heated to a temperature high enough to permit melting of the filler wire 30.

In one embodiment of this invention a filler wire 30 is used that melts below the melting temperature of the washer 10 and the hinge 12. This type of joint formation is known in the art as a heterogenous joint because the base metals (washer, and hinge) differ from the filler wire 30. When using a copper based filler wire 30 this process is known as brazing. Note that when a plasma arc process is used to heat the filler wire 30 and the surrounding metals the process is known as plasma arc brazing or simply as plasma brazing.

In another embodiment, a homogenous joint is formed by melting the washer 10 and the hinge 12 in a specific location such that fusion between the parts occurs. In such an application, a filler wire 30 maybe employed to coalesce with the washer 10 and hinge 12 metals to reinforce the joint. Although both methods are within the contemplation of this invention, the plasma arc brazing method is preferred for use with zinc coated steels because the homogenous joint may cause spatter caused by the burning of the zinc coating.

A mask 26 is placed over the washer 10 to prevent weld spatter from adhering to the face of the washer 10. A force in the direction of the arrow holds the mask 26 in place against the face of the washer 10. The mask 26 can also assist in aligning the plasma torch with the washer 10 and hinge 12. As appreciated, welding processes produce weld spatter, the weld spatter on the face of the washer 10 may cause difficulty during reassembly of the hinge 12. For this reason the mask 26 is provided to prevent spatter from adhering to the face of the washer 10. The mask 26 is not wetted by the filler wire 30 and therefore does not become secured in place atop the washer 10. Preferably, the mask 26 is of such a diameter as to cover no portions of the washer 10 required to produce the weld 20.

Preferably, the weld 20 is simply a tack weld or a point weld such that movement of the plasma torch 24 about the circumference of the washer 10 is not required. It is also within the contemplation of this invention that the plasma torch be moved relative to the washer 10 to produce a larger joint extending about the periphery of the washer 10. In most instances, one or two point or tack welds are all that is required to sufficiently secure the washer 10 into position.

Figure 5:
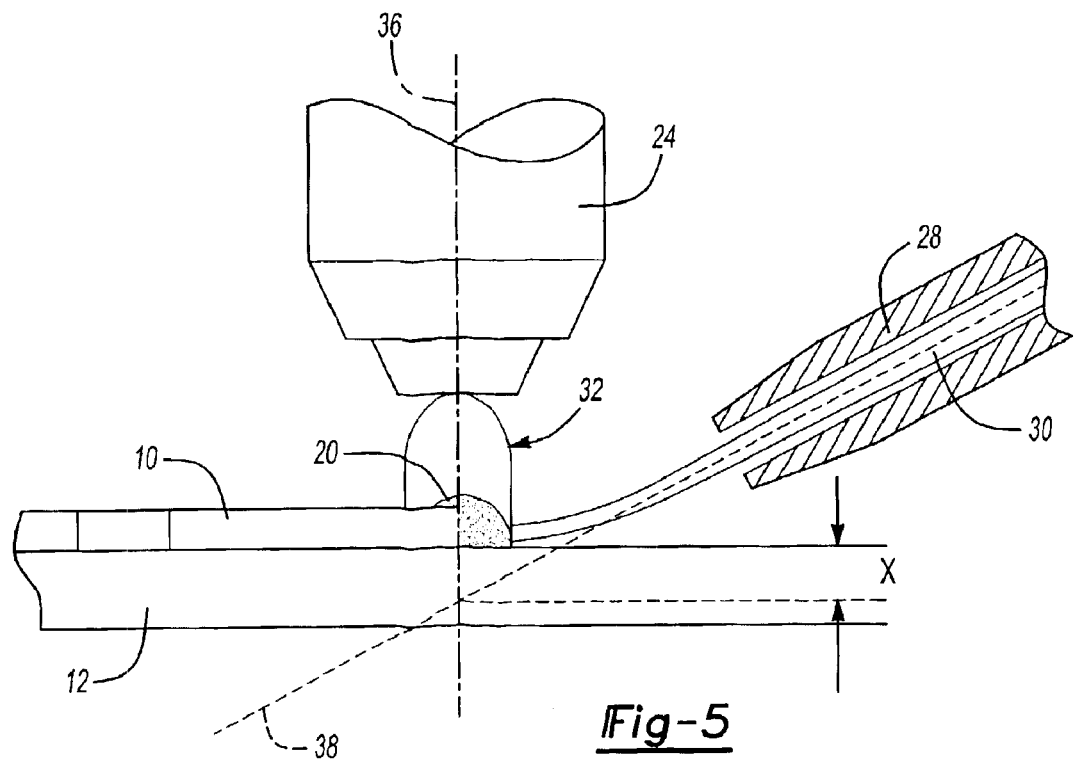
FIG. 5 is a schematic view of feed wire orientation relative to the washer during welding.

Referring to FIG. 5, the position of the plasma torch 24 and the direction of wire feed and position of the wire guide 28 is of great influence on the robustness and quality of the weld joint 20. The intersection point of the filler wire 30 and the actual weld 20 is below the surface of the hinge 12 a distance indicated at "x". This alignment causes the filler wire 30 to contact the surface of the hinge 12 and bend upward toward the periphery of the washer 10. The forward motion of the filler wire 30 improves contact between the molten material and the washer 10 compared to simply feeding the filler wire 30 directly into the plasma arc 32.

Figure 6:
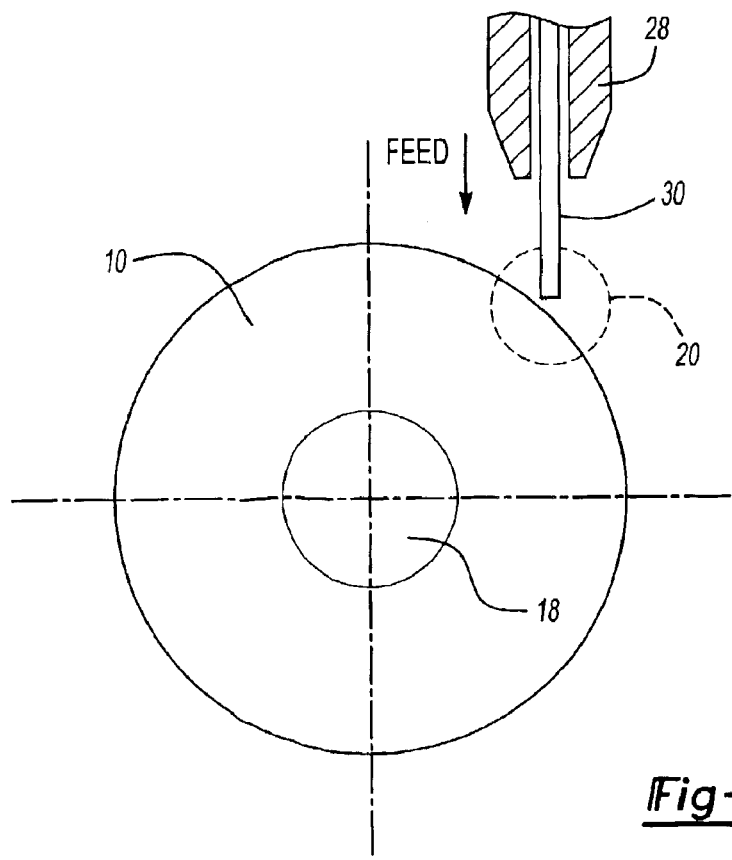
FIG. 6 is another schematic view of feed wire orientation relative to the washer during welding.

FIG. 6 is a plan view of the wire guide 28 relative to the periphery of the washer 10. The filler wire 30 is directed toward the periphery of the washer 10 at a direction that is a combination of tangential and normal to the washer 10. Referring also to FIG. 7A, feeding filler wire 30 tangential to the periphery of the washer 10 allows slight alignment errors to cause a weld 20 to miss the joint between the washer 10 and the hinge 12 such that the washer 10 is not secured to the hinge 12. Referring to FIG. 7B, a normal alignment of the wire guide 28 magnifies slight errors in wire feed such that a cold joint may be formed when the filler wire 30 is fed too quickly. Further, the filler wire 30 can back up, kink, or "bird nest", thereby necessitating stopping of the process to clear the kinked filler wire 30.

The direction of filler wire 30 relative to the periphery of the washer 10 indicated in FIGS. 4 and 5 provide optimal welding operations while accounting for minor variations in the process that may otherwise disrupt the welding process. Preferably, a centerline 38 of the filler wire 30 is aligned to intersect an axis 36 normal to the face of the hinge 12 a distance "x" below the face of the hinge 12. This configuration causes the filler wire 30 to bent upward and proceed along the face of the hinge 12 to increase the contact surface between the hinge 12 and the filler wire 30. This increases wetting between the washer 10 and the hinge 12 that in turn increases the robustness of the weld 20. Further, the filler wire 30 is directed at a point between normal and tangential to the periphery of the washer 10 to increase the robustness of the operation and prevent completely missing the interface between the washer 10 and the hinge 12 and conversely to prevent undesirable chinking of the filler wire 30 or cold welds caused by minor fluctuations in wire feed speed.

Figure 9:
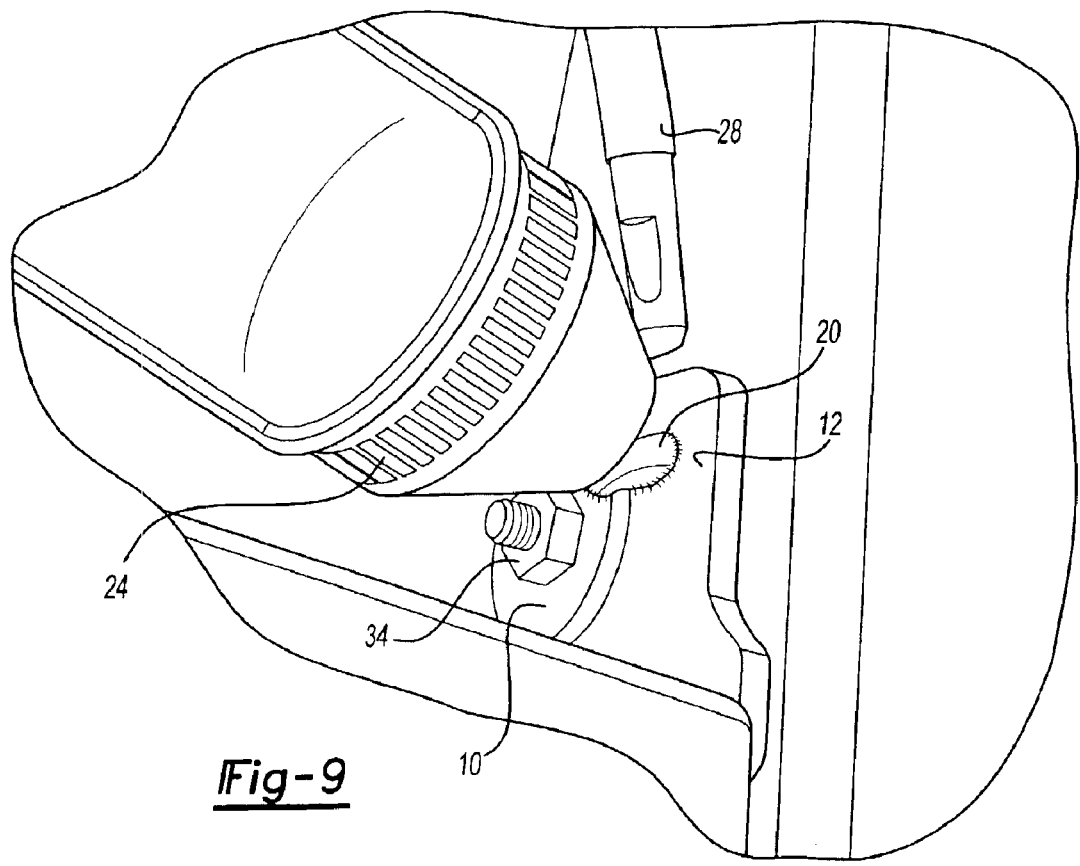
FIG. 9, is another perspective view of the plasma torch along with the wire feed guide.

Referring to FIGS. 8 and 9, the plasma torch 24 is shown during operation to apply a tack weld. The feeder wire guide 28 along with the plasma torch 24 are mounted to a common bracket 40 such that the wire feed guide 28 is properly aligned with the plasma torch and the washer 10 and the hinge 12. During operation, the mask 26 is aligned with the threaded stud 22 to cover the face of the washer 10. The plasma torch is thereby aligned with the interface between the washer 10 and the hinge 12. The plasma arc 32 is initiated to heat the washer 10 and hinge 12 to a temperature sufficient to melt the filler wire 30. The alignment of the wire guide 28 ensures that the filler wire 30 is properly wetted and engages the washer 10 and hinge to provide a robust weld 20. Preferably, only a single spot weld 20 is required to sufficiently secure the washer 10 in place. The door 42 can than be removed from the hinge 12, and reassembled during subsequent assembly with the identical alignment.

Referring to FIG. 10, the next step in the process is to align the door 42 the body 68 and attach the hinges 12 to the body 68. To accomplish this, the door 42 is removed from the mounting fixture 50 and attached to a second mounting fixture 62 for mounting the door 42 to the body 68. Note that in attaching the hinge 12 to the door 42, the hinge 12 is aligned relative to the inner surface of the door 42, and the weather stripping 66. During attachment of the door 42 to the body 68, the outer surface of the door 42 is aligned to the outer surface of the body 68. The door 42 is mounted to the mounting fixture 62, and aligned by way of the position locating pins 54 and the rest blocks 64.

The mounting fixture 62 maintains the aligned position of the door 42 relative to the body 68 regardless of whether or not the hinges 12 are attached to the body 68. This feature provides for the easy assembly of shims to align the door 42. In conventional systems, releasing of the hinge 12 to insert a shim can cause the door 42 to sag. This occurs because the hinge 12 attachment point supports a portion of the weight of the door 42. The result is that door 42 alignments are difficult and inconsistent when shims are required to align the door 42. The mounting fixture 62 of this invention supports the door 42 independent of the hinges 12 such that release of the hinges 12 does not disturb alignment of the door 42 to the body 68.

Once the door 42 is properly aligned, the hinge 42 is attached to the body 68. It is within the contemplation of this invention to attach the hinge 12 to the body 68 by any method known to one skilled in the art. The mounting fixture 62 includes position-locating pins 54 that align the door 42 relative to position locating pins 54 disposed on the body 68. Floating pads 56 are also included in this mounting fixture 62 to aid in the proper alignment of the door 42. The hinge 12 is attached by a threaded member extending through an opening within the hinge and torque down against the body 66. The threaded member may be a stud extending from the body 68 through the hinge 12 and a nut. In addition, a threaded bolt may be inserted through and opening in the hinge 12 into internal threads located within the body 68.

The door 42 is then removed from the hinges 12 by removing nuts 34 that had previously secured the hinge and washer 10. The washer 10 is now affixed to the hinge 12 and remains in place. The hinge 12 remains with the vehicle body 68 during subsequent assembly operations. The door 42 and vehicle body 68 are mated up during a subsequent assembly operation after the desired assembly operations are performed on the now separated parts. The door 42 is then reattached to the hinge 12. The threaded studs 22 are inserted through the hole 18 in the washer to duplicate the previous alignment.

Note that in prior art methods the washer 10 is simply glued on using an adhesive. Often times during reassembly, the threaded stud 22 bangs against a back surface of the washer 10 to disrupt or dislodge completely the washer 10. This destroys the alignment previously attained, and requires realignment, that can result in damage to paint applied to the vehicle body 68 and door 42.

The welding of the washer 10 to the hinge 12 permanently affixes the washer to the hinge 12 such that the alignment between the door 42 and the body 68 are fixed. The door 42 is reinstalled to the hinges 12 and the nuts 34 are threaded onto the threaded studs 22 to complete assembly of the door 42 to the vehicle body 68.

The method of this invention provides a reliable and robust means of maintaining and duplicating alignment of a door or other closure panel to a vehicle body. The washer 10 becomes an integral part of the hinge 12 to provide a custom alignment unique to each vehicle body 68 doors 42 interface. The use of the welded washer further prevents errant dislodgement or loss of the initial alignment between the door 42 and vehicle body 68, thereby preventing potential damage to coating and other subsequently assembled components during reattachment operations.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention.

What is claimed is:

1. A method of mounting a vehicle door to a vehicle body comprising the steps of;
   a. installing a hinge onto a threaded member disposed on the vehicle door;
   b. installing a washer onto the threaded member over an opening defined by the hinge;
   c. aligning the hinge relative to the door;
   d. installing a nut onto the threaded member for holding the washer and the hinge to the door in a desired aligned position; and
   e. welding the washer to the hinge to set said desired aligned position.

2. The method of claim 1, further including the step of aligning the door to the vehicle body and securing the hinge to the vehicle body.

3. The method of claim 2, further including the step of removing the door from the hinge to perform subsequent assembly operations.

4. The method of claim 3, further including the step of reassembling the door to the hinge in the desired aligned position, said desired aligned position maintained by the position of the washer over the opening of the hinge.

5. The method of claim 1, wherein said welding step is further defined by forming a homogeneous joint between the washer and the hinge.

6. The method of claim 1, wherein said welding step is further defined by plasma arc welding the washer to the hinge.

7. The method of claim 6, further defined by using a filler wire with a melting temperature below that of the washer and the hinge forming a heterogeneous joint.

8. The method of claim 6, further including directing a feed wire into an interface between the washer and the hinge.

9. The method of claim 8, further defined by directing the feed wire along a feed axis toward a central axis normal to a face of the hinge.

10. The method of claim 9, further defined by directing the feed wire along the feed axis toward the central axis such that the feed axis intersects the central axis a distance below the surface of the hinge such that the feed wire contacts the surface of the hinge and bends upward toward the washer.

11. The method of claim 10, further defined by directing the feed wire toward the washer at a point about a circumference of the washer between a normal and a tangential alignment.

12. The method of claim 1, including the step of mounting the door to an alignment fixture.

13. The method of claim 12, further defined as mounting the door relative to a position-locating pin.

14. The method of claim 12, further defined as mounting the door relative to a floating pad, the floating pad indicative of weather stripping placement.

15. The method of claim 12, further defined as supporting the door on pads in a vertical and horizontal plane.

16. The method of claim 1, wherein said welding step is further defined by covering a portion of the washer with a mask for preventing weld spatter from contacting a face of the washer.

17. A method of aligning a hinge to a closure panel comprising the steps of:
   a. mounting the closure panel to an alignment fixture;
   b. installing a hinge onto a threaded member extending from the closure panel;
   c. installing a washer onto the threaded member over a hinge opening defined by the hinge;
   d. supporting the hinge in a desired alignment relative to the closure panel;
   e. installing a nut onto the threaded member to secure the washer and the hinge to the closure panel in the desired alignment relative to the closure panel; and
   f. welding the washer to the hinge to set the desired alignment of the closure panel.

18. The method of claim 17, wherein said step d. is further defined as supporting the door relative to a surface for installation of weather stripping.

19. The method of claim 17, wherein said step f. is further defined by directing a feed wire along a feed axis toward a central axis normal to a face of the washer such that the feed axis and the central axis intersect at a point below the face of the washer.

20. The method of claim 19, further defined by directing the feed wire toward the washer at a point about a circumference of the washer between a normal and a tangential alignment.

21. The method of claim 17, wherein said step f. is further defined by producing a plasma arc at an interface between the washer and the hinge and directing a filler wire into the plasma arc.

22. A method of aligning a closure panel to a body structure comprising the steps of:
   a. supporting the closure panel on an alignment fixture;
   b. installing a hinge onto a fastening member extending from the closure panel;
   c. installing a washer onto the fastening member and over a hinge opening within the hinge;
   d. securing the washer and the hinge to the closure panel; and
   f. welding the washer to the hinge to set a desired alignment of the closure panel.

23. The method as recited in claim 22 wherein said step a. includes supporting the closure panel relative to a surface for installation of weather stripping.

24. The method as recited in claim 22 including the step of aligning the closure panel to a body structure and securing the hinge to the body structure.

25. The method as recited in claim 24 including the step of removing the closure panel from the hinge such that subsequent processing of the closure panel may be performed separate from the body structure.

26. The method as recited in claim 25 including reassembling the closure panel to the hinge in said desired alignment maintained by the washer being welded to the hinge.

* * * * *